(12) United States Patent
El-Rashidy et al.

(10) Patent No.: US 11,057,798 B2
(45) Date of Patent: *Jul. 6, 2021

(54) PREDICTIVE CLIENT MOBILITY SESSION MANAGEMENT

(71) Applicant: Comcast Cable Communications, LLC, Philadelphia, PA (US)

(72) Inventors: Teddy El-Rashidy, Philadelphia, PA (US); Colleen Szymanik, Horsham, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/721,196

(22) Filed: Dec. 19, 2019

(65) Prior Publication Data

US 2020/0275320 A1    Aug. 27, 2020

Related U.S. Application Data

(63) Continuation of application No. 15/883,207, filed on Jan. 30, 2018, now Pat. No. 10,548,052.

(51) Int. Cl.
*H04W 36/00* (2009.01)
*H04W 8/08* (2009.01)
*H04W 36/32* (2009.01)
*H04W 36/18* (2009.01)

(52) U.S. Cl.
CPC ....... *H04W 36/0016* (2013.01); *H04W 8/087* (2013.01); *H04W 36/0061* (2013.01); *H04W 36/18* (2013.01); *H04W 36/32* (2013.01)

(58) Field of Classification Search
CPC .................. H04W 8/087; H04W 36/0016
See application file for complete search history.

(56) References Cited

U.S. PATENT DOCUMENTS

| 2004/0105413 | A1* | 6/2004 | Menon ................. H04W 36/14 370/338 |
| 2006/0002324 | A1 | 1/2006 | Babbar et al. |
| 2006/0268834 | A1* | 11/2006 | Bajic ..................... H04L 63/101 370/352 |
| 2008/0013474 | A1* | 1/2008 | Nagarajan ........... H04L 12/4633 370/321 |
| 2009/0052396 | A1* | 2/2009 | Bucker ............. H04W 36/0038 370/331 |
| 2011/0216743 | A1 | 9/2011 | Bachmann et al. |
| 2014/0016612 | A1 | 1/2014 | Montemurro et al. |
| 2015/0249999 | A1* | 9/2015 | Kaippallimalil .... H04W 40/248 370/329 |
| 2017/0041247 | A1* | 2/2017 | Johnson .............. H04L 61/2592 |
| 2019/0013970 | A1* | 1/2019 | Reynolds ............ H04L 12/4625 |

* cited by examiner

*Primary Examiner* — Fahmida S Chowdhury
(74) *Attorney, Agent, or Firm* — BakerHostetler

(57) ABSTRACT

Systems and methods are disclosed that enable predictive device mobility session management in a wireless network. A wireless communications network is able to maintain IP session continuity as a wireless device roams among wireless access points of the communications network by ensuring that the wireless device maintains communications with its home wireless access gateway.

20 Claims, 6 Drawing Sheets

| Source AP | Destination AP | Probability |
|---|---|---|
| A | B | 33% |
| A | C | 16% |
| A | D | 21% |
| A | E | 9% |
| A | F | 6% |
| A | G | 2% |
| A | H | 6% |
| A | I | 7% |

PREDICTIVE CLIENT MOBILITY SESSION MANAGEMENT

CROSS REFERENCE TO RELATED APPLICATIONS

This application is a continuation of U.S. patent application Ser. No. 15/883,207, filed Jan. 30, 2018, which is hereby incorporated by reference in its entirety.

BACKGROUND

A wireless network that provides wireless communications services to a large number of subscribers over a large geographic area, typically comprises a large number of wireless access points dispersed over the geographic area. Mobile computing devices (i.e., wireless devices), such as mobile telephones, laptop computers, tablet computers, and the like, connect to an access point to gain access to the network. Each wireless access point is typically associated with and in communication with a regional wireless access gateway. Each wireless access gateway may support a number of wireless access points in the network. The wireless access gateway is responsible for assigning Internet Protocol (IP) addresses and establishing IP sessions for wireless devices that connect to the network via one of the wireless access points that the wireless access gateway serves. In the past, when a wireless device "roams" from a wireless access point served by a first wireless access gateway to another wireless access point that normally is served by a second, different wireless access gateway, the current IP session of the wireless device must be terminated and a new session started by the second wireless access gateway. This sort of session interruption is disruptive to the user of the wireless device.

One technique for avoiding such IP session interruption involves the new wireless access gateway tunneling back to the home wireless access gateway to preserve the current session and the original IP address allocated to the wireless device. But this approach may be resource intensive and may consume valuable bandwidth in the network. Improved methods and systems for maintaining IP session continuity during wireless device roaming is desirable.

SUMMARY

Systems and methods are disclosed that enable predictive device mobility session management in a wireless network. The systems and methods disclosed herein enable a wireless communications network to more efficiently maintain IP session continuity as a wireless device roams among wireless access points of the communications network.

According to one aspect, in a communications network comprising a plurality of wireless access points and a plurality of wireless access gateways, wherein each of the wireless access gateways is assigned to serve a different group of the plurality of wireless access points, a roaming database of the communications network may receive information indicating that a wireless device has established connection with a first wireless access point of the communications network and has established an Internet Protocol (IP) session via a first wireless access gateway associated with the first wireless access point. Using information obtained by the roaming database, the roaming database may determine at least one wireless access point that is a neighbor of the first wireless access point and to which the wireless device may roam. The roaming database may then send a message to the neighboring wireless access point comprising an identifier of the wireless device and an identifier of the first wireless access gateway via which the IP session has been established. The neighboring wireless access point may store this identifier pair. In the event that the wireless device does roam to the neighboring wireless access point, the neighboring wireless access point can use the stored identifiers to maintain the IP session with the first wireless access gateway, without switching the wireless device to a different wireless access gateway that normally services that neighboring wireless access point.

According to another aspect, a wireless access point of the communications network may receive a message comprising an identifier of a wireless device and an identifier of a first wireless access gateway with which an Internet Protocol (IP) session has been established via another wireless access point of the communications network. The wireless access point may store, in a memory of the wireless access point, the identifier of the wireless device and the identifier of the first wireless access gateway. The wireless access point may subsequently receive a request from a wireless device to access the communications network. The wireless access point may determine that an identifier of the requesting wireless device matches the stored wireless device identifier. When a match is determined, the wireless access point may establish communications with the requesting wireless device and may use the identifier of the first wireless access gateway to maintain the IP session of the wireless device with the first wireless access gateway instead of switching the wireless device to a different wireless access gateway that normally services the wireless access point.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Systems and methods are disclosed that enable predictive device mobility session management in a wireless network.

The systems and methods disclosed herein enable a wireless communications network to more efficiently maintain IP session continuity as a wireless device roams among wireless access points of the communications network.

Figure 1:
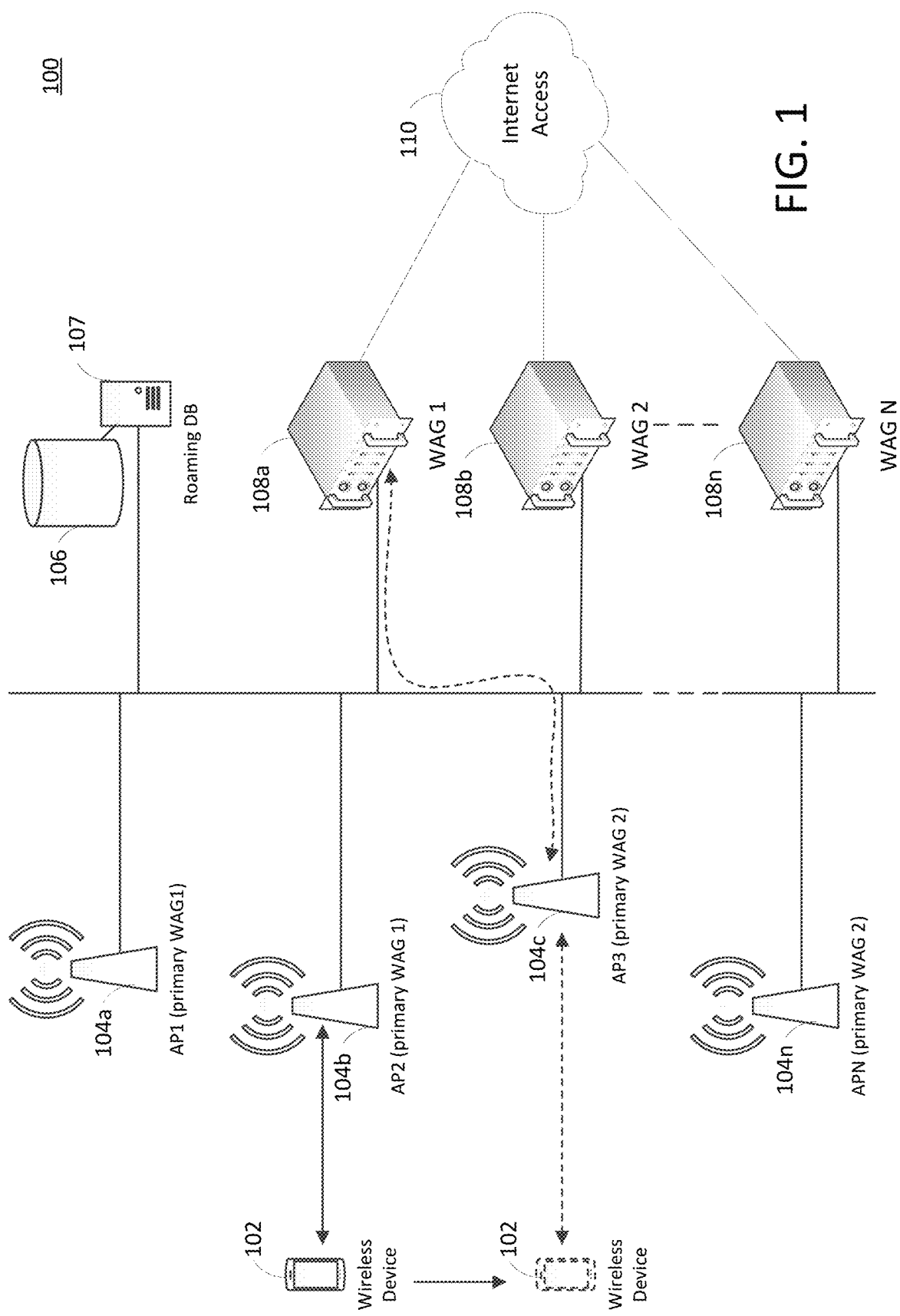
FIG. 1 is a diagram illustrating an example communications network.

FIG. 1 is a diagram illustrating an example communications network 100 in which the systems and methods described herein may be employed. The communications network 100 may comprise any communications network that supports Internet Protocol (IP) connectivity, including IPv4, IPv6, etc.

As shown, the communications network 100 comprises a plurality of wireless access points 104a, 104b, 104c, . . . 104n. The wireless access points 104a-n may be disposed throughout an area, such as a geographic area, to provide wireless devices, such as wireless device 102, with wireless access to the communications network 100. Each wireless access point 104a-n may utilize any suitable radio access technology for facilitating wireless connectivity with the communications network in a limited area, such as a place of business, a home, a vehicle, a campus, or other area. For example, each wireless access point 104a-n may implement the IEEE 802.11 ("Wi-Fi") radio access technology. In other implementations, other radio access technologies may be employed, such as IEEE 802.16 or 802.20 ("WiMAX"), IEEE 802.15.4a ("Zigbee"), or 802.15.3c ("UWB").

A wireless device, such as the wireless device 102, may comprise any of a variety of different types of wireless devices, including for example, a smartphone, a tablet computer, a laptop computer, a notebook computer, a personal computer, a personal digital assistant (PDA), a user equipment (UE), a mobile station, a fixed or mobile subscriber unit, a pager, a wireless sensor, other consumer electronics, and the like.

Each wireless access gateway 108a-n may serve as a gateway to other communications networks, such as the Internet 110. The Internet 110 may include a global system of interconnected computer networks and devices that use common communication protocols, such as the transmission control protocol (TCP), user datagram protocol (UDP), and the internet protocol (IP) in the TCP/IP internet protocol suite.

Each wireless access gateway may serve a number of the wireless access points 104a-n in the network and is responsible for assigning Internet Protocol (IP) addresses and establishing IP sessions for wireless devices that connect to the network via one of the wireless access points 104a-n that the wireless access gateway serves. The wireless access points 104a-n and wireless access gateways 108a-n may be connected via any suitable wired or wireless network technology. For example, the wireless access points 104a-n and wireless access gateways 108a-n may communicate over a private local area or wide area network.

Although each wireless access point 104a-n is able to communicate with more than one of the wireless access gateways 108a-n, in one implementation each wireless access point 104a-n is associated with one respective wireless access gateway 108 that serves as its "primary" wireless access gateway. In operation, a wireless device, such as wireless device 102, will move into range of one of the wireless access points 104a-n, for example wireless access point 104b. Using a wireless communications protocol, such as the IEEE 802.11 protocol for example, the wireless device will transmit a message to the wireless access point 104b requesting access to the communications network, including the assignment of an IP address for the wireless device and the establishment of an IP session connecting the wireless device 102 to other networks, such as the Internet 110. Initial attachment to the wireless access point 104b may also involve an authentication protocol by which the wireless device is authenticated by the wireless access point 104b for connection to the communications network 100. For example, authentication may be performed using Extensible Authentication Protocol (EAP) as defined in IEEE 802.1X or using any variant thereof or like protocol. After the wireless device 102 is authenticated by the wireless access point 104b, the wireless access point 104b will communicate with its primary wireless access gateway (in this example wireless access gateway 108a), which is responsible for assigning an IP address to the wireless device 102 and establishing the IP session. Once the IP session is established, the wireless device 102 is able to transmit and receive data, via the wireless access point 104b and the wireless access gateway 108a, with other devices on the Internet. A wireless access gateway, such as the wireless access gateway 108a in the example of FIG. 1, that initially assigns an IP address to a wireless device and that establishes an IP session for the wireless device may be referred to herein as the wireless device's "home" wireless access gateway.

As further illustrated in FIG. 1, at some point in time after the wireless device 102 has connected to the first wireless access point 104b and established an IP session with the access point's primary wireless access gateway 108a, the wireless device 102 may move out of the wireless communications range of the wireless access point 104b and into the wireless communications range of a different wireless access point, such as the wireless access point 104c—as illustrated in FIG. 1 for example. This different wireless access point (e.g., wireless access point 104c) may have an associated primary wireless access gateway (e.g., wireless access gateway 108b) that differs from the wireless access gateway (e.g., wireless access gateway 108a) of the first wireless access point to which the wireless device was previously connected (e.g., wireless access point 104b). As mentioned above, it is desirable for the wireless device 102 to be able to maintain the IP address assigned to it by the first wireless access gateway (e.g., the device's home wireless access gateway 108a) and to maintain the IP session established with that wireless access gateway—as opposed to having to obtain a new IP address and establish a new IP session with the different primary wireless access gateway (e.g., wireless access gateway 108b) associated with the new wireless access point to which the wireless device has connected after roaming. As mentioned above, an existing technique for avoiding such IP session interruption involves the new wireless access gateway tunneling back to the home wireless access gateway to preserve the current session and the original IP address allocated to the wireless device. But this approach may be resource intensive and may consume valuable bandwidth in the network. Disclosed herein are improved methods and systems for maintaining IP session continuity during wireless device roaming.

According to methods and systems disclosed herein, a database 106 is maintained on the communications network 100. The database 106 may be hosted on any suitable computing device 107, such as for example, a server or the like, connected to the network 100. The database 106 may be referred to herein as a "roaming database (DB)" 106 and may provide various functionality to the communications network.

According to one aspect, the roaming DB 106 may store, for each wireless device that has connected to the communications network 100 via one of the wireless access points 104a-n, an identifier associated with the wireless device and an identifier of the device's home wireless access gateway— i.e., the primary wireless access gateway associated with the wireless access point to which the wireless device initially connected and which assigned and established the device's current IP address and IP session. The identifier of the wireless device may comprise any suitable identifier capable of distinguishing the wireless device from other wireless devices on the communications network. For example, the identifier of the wireless device may comprise the media access control (MAC) address of the wireless device. Other suitable identifiers may be employed. Similarly, the identifier of the device's home wireless access gateway may comprise any suitable identifier capable of distinguishing the wireless access gateway from other wireless access gateways on the communications network. For example, the identifier of the home wireless access gateway may comprise an IP address assigned to the wireless access gateway by, for example, an administrator of the network. Other suitable identifiers may alternatively, or in addition, be employed. For example, an identifier of the wireless access gateway, such as a Domain Name System (DNS) name, may be stored from which the IP address of the wireless access gateway on the communications network may be determined or retrieved via lookup.

In addition, for each wireless device connected to the communications network 100, the roaming DB may maintain an identifier of the current wireless access point 104a-n to which the wireless device is connected. The identifier of the current wireless access point may comprise a MAC address, an IP address, or any other suitable identifier that may distinguish the wireless access point from other wireless access points of the network. This information, as well as the identifier of the wireless device and the identifier of the device's home wireless access gateway, may be received or derived by the roaming DB 106 from accounting messages, such as one or more RADIUS Accounting messages, transmitted on the communications network 100 and enabling the roaming DB 106 to keep track of current wireless device sessions. In addition to the information identifying the current wireless access point to which the wireless device is connected, the roaming DB 106 may store and maintain information identifying one or more other wireless access points 104a-n to which the wireless device may roam in the communications network 100.

Figures 2, 3:
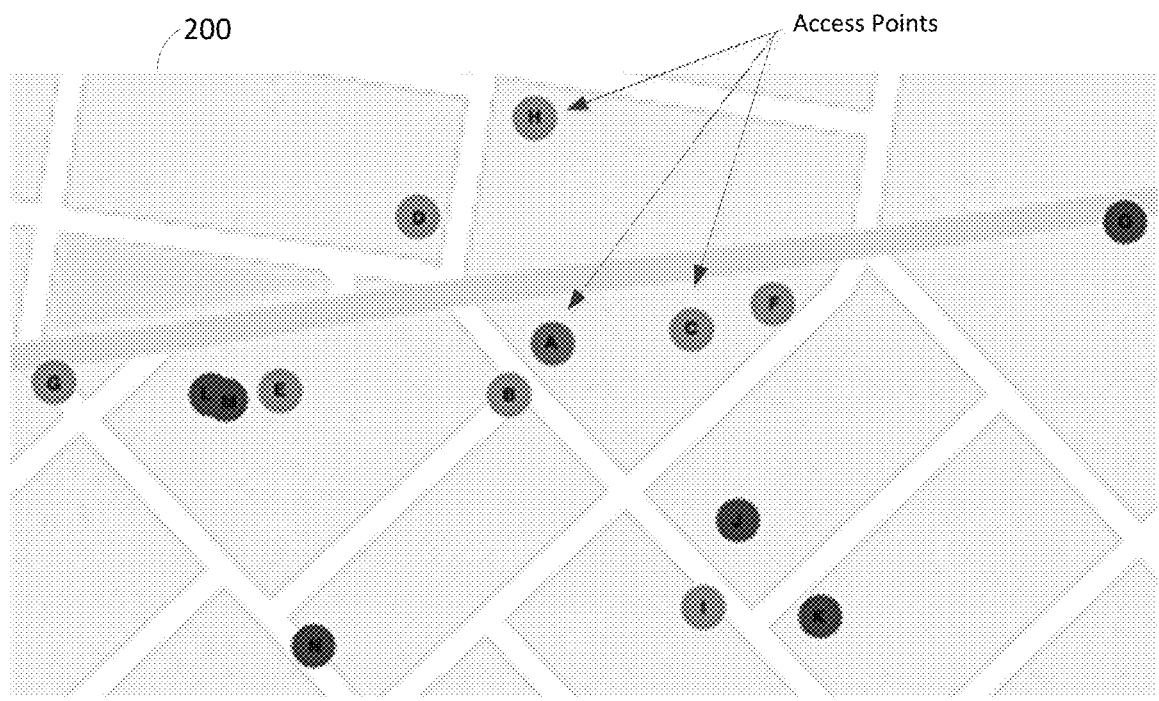
FIG. 2 depicts an example geographic area in which a plurality of wireless access points, such as the wireless access points 104a-n of FIG. 1, may be located.
FIG. 3 shows example information that a database may store.

In one aspect, the information identifying another wireless access point to which the wireless device may roam may be stored in the form of a value representing a probability of the wireless devices roaming to that other wireless access point. By way of example, FIG. 2 depicts an example geographic area 200 in which a plurality of wireless access points, such as the wireless access points 104a-n of FIG. 1, may be located. For purposes of illustration, the wireless access points are denoted in FIG. 2 with respective letters "A" through "O". Continuing the example, assume that a wireless device is currently wirelessly connected to wireless access point A. For that wireless device, the roaming DB 106 may maintain the example information illustrated in FIG. 3. As shown in this example, given the current wireless access point to which the wireless device is currently connected—denoted in FIG. 3 as the "Source AP" and identified as wireless access point "A," the roaming DB may store, for each of a number of other wireless access points B, C, D, E, F, G, H, and I, a probability that the wireless device may roam from wireless access point "A" to that other wireless access point. For example, the roaming DB 106 may store information (e.g., a value) indicating that there is a 33% probability that the wireless device may roam from wireless access point A to wireless access point B. Similarly, the roaming DB 106 may store information indicating that there is a 16% probability that the wireless device may roam from wireless access point A to wireless access point C, and so on.

The probabilities illustrated by example in FIG. 3 may be determined using any of a variety of suitable methods from data received from a variety of suitable sources, such as accounting messages, client device analytics, geolocation analysis, neighbor scans of the network, and the like. Alternatively, individual wireless device mobility patterns may be created over time based on historical mobility data and used to improve the prediction/probability accuracy of the roaming DB 106.

Figure 4:
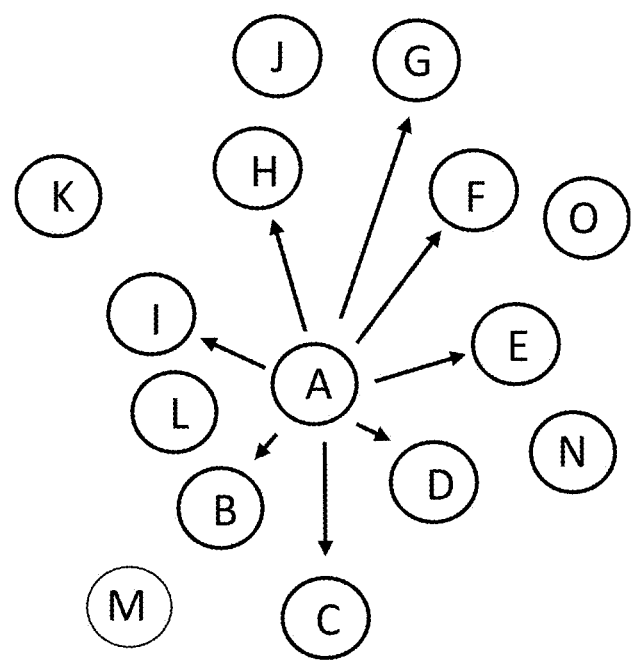
FIG. 4 shows another example of information that a database may store.

FIG. 4 shows another example in which the information identifying one or more other wireless access points to which the wireless device may roam is stored in the form of a graph of vectors in which a length of a given vector represents the probability that the wireless device may roam to that wireless access point. It is understood, however, that the information may be stored in any suitable form, data structure, representation, or the like.

From the information maintained by the roaming DB 106, the roaming DB may determine one or more (e.g., at least one) wireless access points that are neighbors of the wireless access point to which a wireless device is currently connected, i.e., neighboring wireless access points to which the wireless device may roam. For example, the roaming DB 106 may select all of the wireless access points for which a probability of roaming is provided in the database—only excluding, for example, wireless access points for which no probability of roaming is provided. In the example database of FIG. 3, the determined wireless access points in that case would comprise wireless access points B, C, D, E, F, G, H, and I. Alternatively, the roaming DB may select a subset of the wireless access points for which a probability value is provided using some criteria for selection. For example, the roaming DB 106 may select those wireless access points that have a probability value at or above a threshold value. For example, the roaming DB 106 may select those wireless access points having a probability value that exceeds 20%. In the example of FIG. 3, the roaming DB 106 would in that case determine/select wireless access points B and D, as each of those has a respective probability value greater than 20%. In other examples, the threshold could be higher or lower. Other methods for determining wireless access points that are neighbors of a current wireless access point and to which a wireless device may roam may also be employed. It is understood that the methods and systems disclosed herein are not limited to any one manner of determining wireless access points to which a wireless device may roam, and the claimed methods and systems are intended to encompass all such possibilities.

As described hereinafter, after determining one or more neighboring wireless access point to which a wireless device connected to the network may roam, the roaming DB may inform the neighboring wireless access point(s) of the identity of the wireless device and the device's home wireless access gateway from which the wireless device obtained its current IP address and IP session, i.e., the primary wireless access gateway of the wireless access point to which the wireless device initially attached. In the event that the wireless device subsequently roams to one of those determined neighboring wireless access points, the new wireless access point can use that information to maintain the wireless device's connectivity to that home wireless access gateway, even if the new wireless access point is associated with a different primary wireless access gateway. This enables the communications network to maintain the IP address and IP session of the wireless device without having to resort to tunneling or other mechanisms that are less efficient and potentially consume excessive bandwidth.

Figure 5:
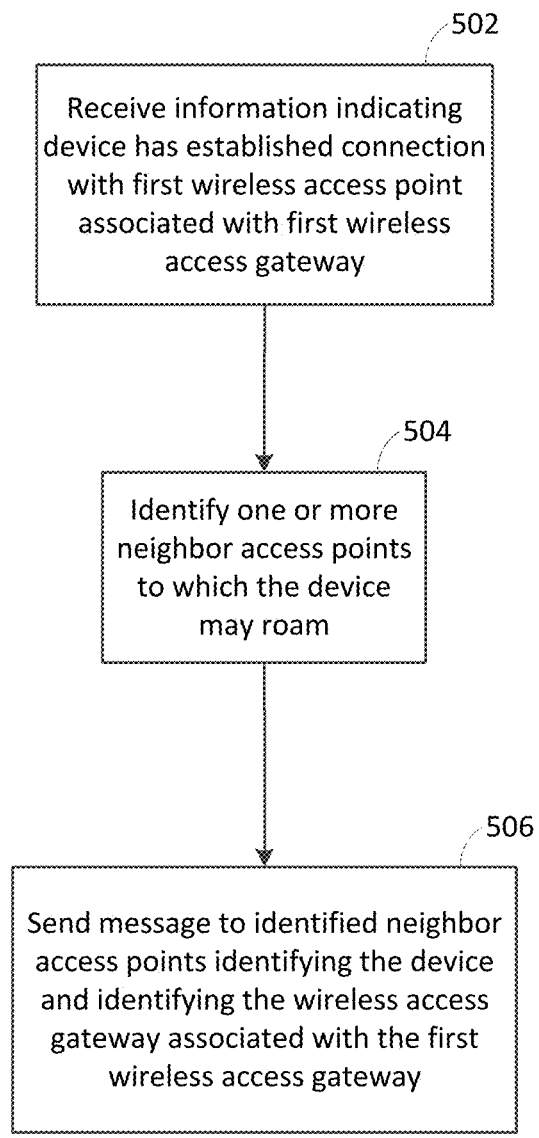
FIG. 5 is a flow diagram illustrating a method for client mobility session management.

FIG. 5 illustrates one example method 500 that may be performed, for example, by the roaming DB 106 in accordance with the methods and systems described herein. In step 502, the roaming DB may receive information indicating a wireless device has established a connection with a first wireless access point. This information may be received or derived by the roaming DB 106 from accounting messages, such as RADIUS Accounting messages, sent to the roaming DB 106 to enable the roaming DB 106 to keep track of current wireless device sessions. In other implementations, the information may be obtained from other sources. The first wireless access point may be associated with a first wireless access gateway that serves as the primary wireless access gateway for the first wireless access point. The first wireless access gateway may be referred to as the home wireless access gateway for the wireless device. The first wireless access gateway may have assigned an IP address to the wireless device and may have established an IP session for the wireless device.

In response to receiving this information, and as described above, the roaming DB 106 may store an identifier associated with the wireless device and an identifier of the device's home wireless access gateway—i.e., the primary wireless access gateway associated with the first wireless access point. The identifier of the wireless device may comprise any suitable identifier capable of distinguishing the wireless device from other wireless devices on the communications network. For example, the identifier of the wireless device may comprise the media access control (MAC) address of the wireless device. Similarly, the identifier of the device's home wireless access gateway may comprise any suitable identifier capable of distinguishing the wireless access gateway from other wireless access gateways on the communications network. For example, the identifier of the home wireless access gateway may comprise an IP address assigned to the wireless access gateway by, for example, an administrator of the network 100.

In addition, the roaming DB may maintain for the wireless device an identifier of the current wireless access point 104a-n to which the wireless device is connected. In addition to the information identifying the current wireless access point to which the wireless device is connected, the roaming DB 106 may maintain information identifying one or more other wireless access points 104a-n to which the wireless device may roam in the communications network 100.

From the roaming information maintained by the roaming DB 106, the roaming DB may in step 504 determine one or more wireless access points that are neighbors of the first wireless access point and to which the wireless device may roam. The roaming DB 106 may determine the one or more wireless access points using any of a variety of methods. For example, the roaming DB 106 may select one or more wireless access points for which the probability of the wireless device roaming to those wireless access points satisfies a threshold. Alternatively, the roaming DB 106 may select all wireless access points for which the probability of the wireless device roaming to those wireless access points is greater than zero. As another alternative, the roaming DB 106 may select one or more wireless access points to which the wireless device may roam based on other criteria, such as distance from the first wireless access point. For example, the roaming DB may select one or more wireless access points that are within a certain radius (e.g., 500 yards) of the first wireless access point. Any suitable criteria may be employed.

In step 506, the roaming DB 106 may send a message to each of the one or more neighboring wireless access points determined in step 504, wherein the message comprises the identifier of the wireless device (e.g., MAC address) and the identifier (e.g., IP address or the like) of the first wireless access gateway via which the device's IP session has been established, i.e., the device's home wireless access gateway. The neighboring wireless access points that receive the message may store the information in memory local to the wireless access point. In the event that the wireless device subsequently roams to one of those neighboring wireless access points, that neighboring wireless access point can recognize the wireless device from the stored identifier thereof and can use the identifier of the first (i.e., home) wireless access gateway to maintain the IP session with the first wireless access gateway without switching the wireless device to a different primary wireless access gateway that normally services that neighboring wireless access point.

Figure 6:
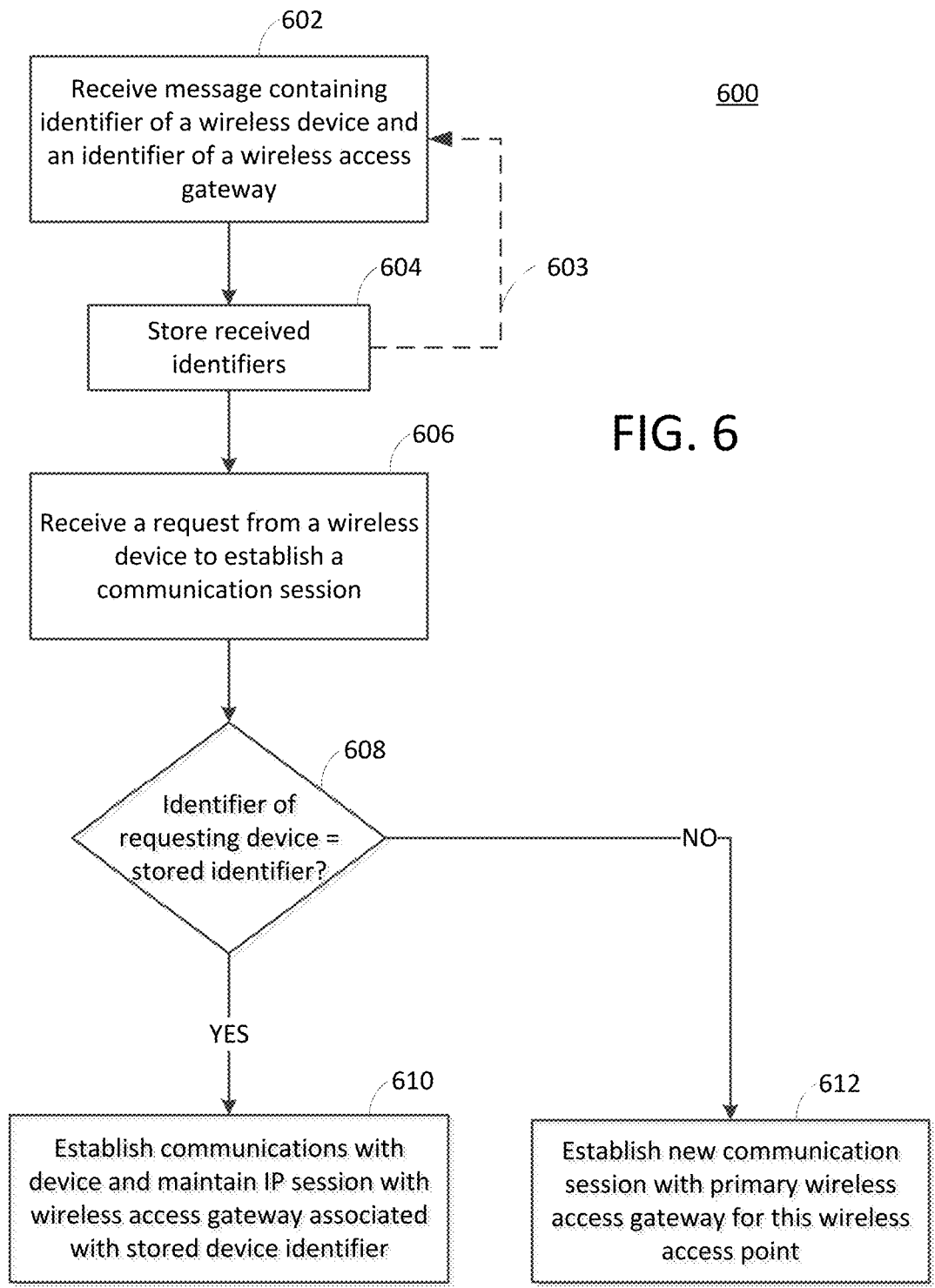
FIG. 6 is a flow diagram illustrating another method for client mobility session management.

FIG. 6 illustrates another example method which may be performed, for example, by any one of the wireless access points 104a-n of the communications network. As shown, in step 602, a wireless access point may receive a message containing an identifier (e.g., MAC address) of a wireless device and an identifier of a wireless access gateway that serves as the home wireless access gateway for an IP session established for the wireless device. In normal operation, the wireless device will not be connected to the wireless access point but may be expected to roam into range of the wireless access point at some point in the future. The home wireless access gateway identified in the received message may be a different wireless access gateway than the primary wireless access gateway associated with this wireless access point.

In step 604, the wireless access point may store the identifiers received in the message in a memory of the wireless access point. The identifiers may be stored in any suitable format or data structure that preserves the association between the identifier of the wireless device and the identifier of the home wireless access gateway. For example, the identifiers may be stored in the form of a table, database, or the like.

As indicated by the line 603 in FIG. 6, the wireless access point may receive other messages identifying other wireless device/home wireless gateway identifier pairs and may store the identifier pairs from each such message in its memory.

In step 606, the wireless access point may receive a request from a new wireless device (i.e., one that is not currently connected to it) to access the communications network 100 via that wireless access point. For example, the request may be in the form of a message in accordance with an IEEE 802.11 protocol or the like. The request may contain an identifier of the wireless device of the type received in the messages received in step 602. For example, the request may contain a MAC address of the requesting wireless device.

In step 608, the wireless access point may search the stored wireless device/home wireless access gateway identifier pairs stored in its memory to determine whether the identifier of the requesting wireless device matches any of the stored wireless device identifiers. If a match is found, then in step 610, the wireless access point will proceed to establish communications with the wireless device and to allow it to connect to the network in accordance with the communications protocol supported by the wireless access point. In addition, the wireless access point will retrieve the stored home wireless access gateway identifier associated with the wireless device identifier in its memory and will use that home wireless access gateway identifier to communicate with the identified home wireless access gateway in order to maintain the IP session that the identified home wireless access gateway previously established for the wireless device. As mentioned above, the identified home wireless access gateway for the wireless device may not be the same wireless access gateway that normally serves as the primary wireless access gateway for this wireless access point. Thus, despite the fact that the wireless access point may normally use the services of a different wireless access gateway for wireless devices connected to it, the method of FIG. 6 (and associated method of FIG. 5) enable the IP session previously established for the wireless device by the identified home wireless access gateway to be maintained. Moreover, this method avoids the need for tunneling between the primary wireless access gateway of this wireless access point and the different home wireless access gateway identified for the wireless device. Instead, the wireless access point uses the services of the identified home wireless access gateway for this requesting wireless device.

Any suitable tunneling protocol may be used to maintain the IP session of the wireless device with the device's home wireless access gateway, including, for example, the Generic Routing Encapsulation (GRE) protocol, the Layer Two Tunneling Protocol (L2TPv3), the Internet Protocol Security (IPsec) protocol, or other Virtual Private Networking (VPN) protocol. That is, instead of the wireless access point using only a single tunnel from that wireless access point to its primary wireless access gateway for all connected wireless device traffic, the wireless access point would maintain concurrent tunnels—one to its primary wireless access gateway for all IP sessions originating with that primary wireless access gateway, and one or more concurrent tunnels to other home wireless access gateways for any wireless devices that roam into its range but have IP sessions previously established by those other home wireless access gateways, as identified by the information stored in step 604 of FIG. 6.

If in step 608, the identifier of the requesting wireless device is found not to match any of the stored wireless access identifiers, then in step 612, the wireless access point will proceed to establish communications with the wireless device and to use the services of its normal primary wireless access gateway for any IP address assignment and IP session establishment functions.

Figure 7:
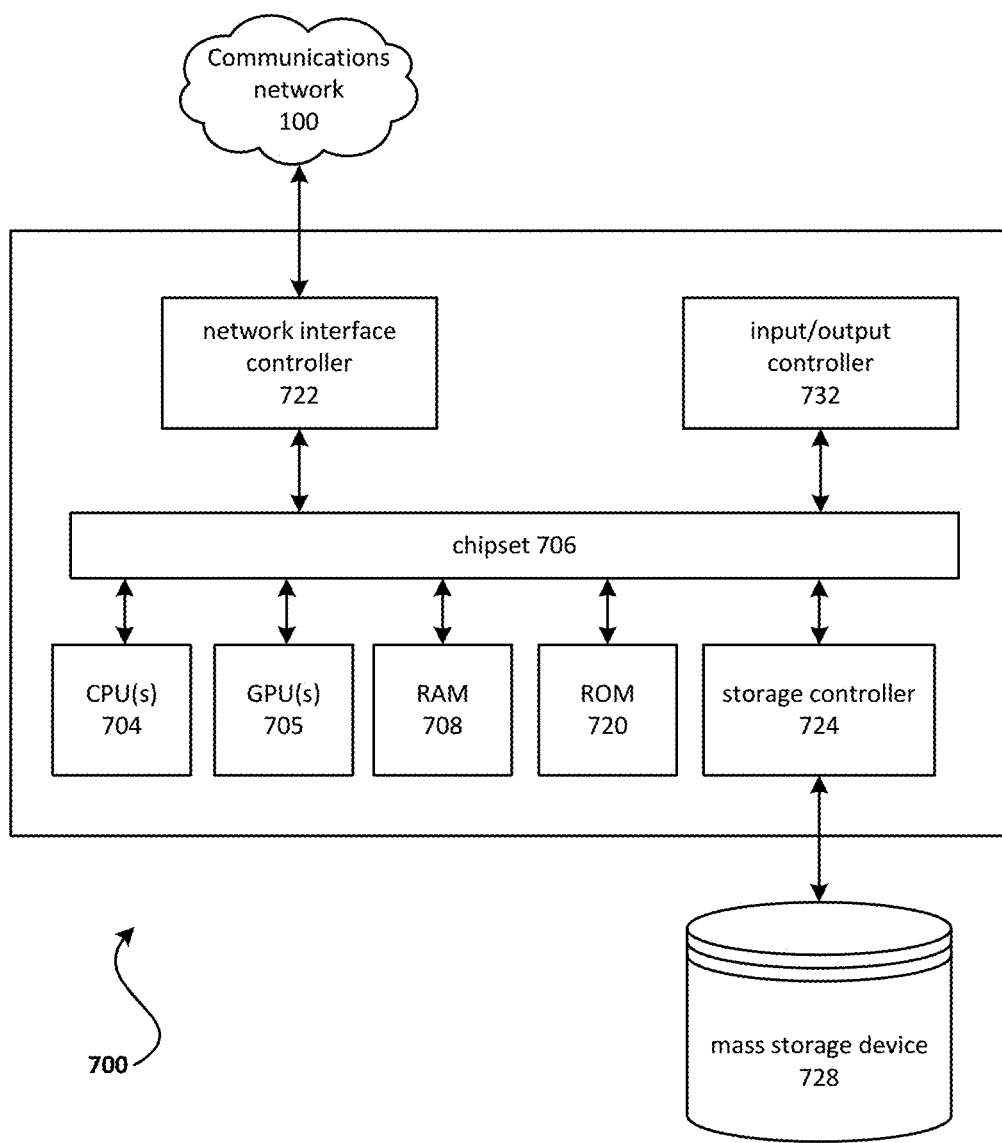
FIG. 7 shows a block diagram of an example computing device.

FIG. 7 depicts an example computing device 700 that may represent any of the various devices or entities illustrated in FIG. 1, including, for example, the wireless device 102, the roaming DB 106, and/or its associated server 107. That is, the computing device 700 shown in FIG. 7 may be any smartphone, server computer, workstation, access point, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the devices described herein, such as to implement any of the devices of FIG. 1 or any of the methods described in relation to FIGS. 2, 3, 4, 5, and 6.

The computing device 700 may include a baseboard, or "motherboard," which is a printed circuit board to which a multitude of components or devices may be connected by way of a system bus or other electrical communication paths. One or more central processing units (CPUs or "processors") 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over the communications network 100. It should be appreciated that multiple NICs 722 may be present in the computing device 700, connecting the computing device to other types of networks and remote computer systems. The NIC may also comprise any suitable wireless network interface controller capable of wirelessly connecting and communicating with other devices or computing nodes on the communications network 100. For example, the NIC 722 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 700 may be connected to a mass storage device 728 that provides non-volatile storage (i.e., memory) for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA)

interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 2, 3 and 5.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing device may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable instructions (e.g., computer software or program code) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A method, comprising:
   determining that a wireless device may roam from a first wireless access point associated with a first wireless access gateway of a network to a second wireless access point associated with a second wireless access gateway of the network, wherein the wireless device has established an Internet Protocol (IP) session via the first wireless access gateway associated with the first wireless access point;
   sending, to the second wireless access point, a message comprising an identifier of the wireless device and an identifier of the first wireless access gateway via which the IP session has been established; and
   causing, based on sending the message, the second wireless access point to maintain the IP session via the first wireless access gateway in the event the wireless device roams to the second wireless access point.

2. The method recited in claim 1, wherein the identifier of the wireless device comprises a media access control (MAC) address of the wireless device.

3. The method recited in claim 1, wherein the identifier of the first wireless access gateway comprises an Internet Protocol (IP) address of the first wireless access gateway.

4. The method recited in claim 1, further comprising receiving information indicating that the wireless device has established connection with the first wireless access point and has established the IP session via the first wireless access gateway, wherein the information comprises the identifier of the wireless device, the identifier of the first wireless access gateway, and an identifier of the first wireless access point.

5. The method recited in claim 4, wherein the received information is received in a RADIUS Accounting message.

6. The method recited in claim 1, further comprising:
   storing the identifier of the wireless device in association with an identifier of the first wireless access point and the identifier of the first wireless access gateway.

7. The method recited in claim 1, further comprising:
   storing the identifier of the wireless device in association with information identifying one or more other wireless access points to which the wireless device may roam in the network, and
   wherein the determining that the wireless device may roam from the first wireless access point to the second wireless access point is based on the stored identifying information.

8. The method recited in claim 7, wherein the information identifying one or more other wireless access points to which the wireless device may roam comprises, for each of the one or more other wireless access points, a value indicating a probability that the wireless device may roam to that other wireless access point.

9. The method recited in claim 1, wherein the determining that the wireless device may roam from the first wireless access point to the second wireless access point comprises determining that a probability associated with the wireless device roaming from the first wireless access point to the second wireless access satisfies a threshold.

10. The method recited in claim 1, wherein the wireless device and first and second wireless access points communicate in accordance with an IEEE 802.11 communications protocol.

11. A method, comprising:
    receiving, at a first wireless access point associated with a first wireless access gateway of a network, a message comprising an identifier of a wireless device and an identifier of a second wireless access gateway with which the wireless device has established an Internet Protocol (IP) session via a second wireless access point associated with the second wireless access gateway;
    receiving, at the first wireless access point, a request from a wireless device to access the network;
    determining, by the first wireless access point, that an identifier of the requesting wireless device matches the wireless device identifier of the received message;
    establishing, by the first wireless access point, communications with the requesting wireless device; and
    maintaining, by the first wireless access point and based on the identifier of the second wireless access gateway of the received message, the IP session of the wireless device with the second wireless access gateway.

12. The method recited in claim 11, wherein the identifier of the wireless device comprises a media access control (MAC) address of the wireless device.

13. The method recited in claim 11, wherein the identifier of the second wireless access gateway comprises an Internet Protocol (IP) address of the second wireless access gateway.

14. The method recited in claim 11, wherein the requesting wireless device and the first and second wireless access points communicate in accordance with an IEEE 802.11 communications protocol.

15. The method recited in claim 11, wherein the message is received based on a determination that the identified wireless device may roam into communications range of the first wireless access point.

16. The method recited in claim 15, wherein the determination is based on a probability that the wireless device may roam into communications range of the wireless access point.

17. A computing device comprising:
    one or more processors; and
    memory storing instructions that, when executed by the one or more processors, cause the computing device to:
    determine that a wireless device may roam from a first wireless access point associated with a first wireless access gateway of a network to a second wireless access point associated with a second wireless access gateway of the network, wherein the wireless device has established an Internet Protocol (IP) session via the first wireless access gateway associated with the first wireless access point;
    send, to the second wireless access point, a message comprising an identifier of the wireless device and an identifier of the first wireless access gateway via which the IP session has been established; and
    cause, based on sending the message, the second wireless access point to maintain the IP session via the first wireless access gateway in the event the wireless device roams to the second wireless access point.

18. The computing device recited in claim 17, wherein the instructions, when executed by the one or more processors, further cause the computing device to:
    store the identifier of the wireless device in association with information identifying one or more other wireless access points to which the wireless device may roam in the network, and
    wherein the determining that the wireless device may roam from the first wireless access point to the second wireless access point is based on the stored identifying information.

19. The computing device recited in claim 18, wherein the information identifying one or more other wireless access points to which the wireless device may roam comprises, for each of the one or more other wireless access points, a value indicating a probability that the wireless device may roam to that other wireless access point.

20. The computing device recited in claim 17, wherein the determining that the wireless device may roam from the first wireless access point to the second wireless access point comprises determining that a probability associated with the wireless device roaming from the first wireless access point to the second wireless access satisfies a threshold.

\* \* \* \* \*